United States Patent
Eriksen

(10) Patent No.: US 9,803,694 B2
(45) Date of Patent: Oct. 31, 2017

(54) DIRECT DRIVE WIND TURBINE WITH A COOLING SYSTEM

(75) Inventor: Uffe Eriksen, Horsens (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 1190 days.

(21) Appl. No.: 13/520,396

(22) PCT Filed: Mar. 26, 2010

(86) PCT No.: PCT/EP2010/053986
§ 371 (c)(1),
(2), (4) Date: Jul. 3, 2012

(87) PCT Pub. No.: WO2011/082836
PCT Pub. Date: Jul. 14, 2011

(65) Prior Publication Data
US 2012/0280511 A1 Nov. 8, 2012

(30) Foreign Application Priority Data
Jan. 11, 2010 (EP) ..................... 10000194

(51) Int. Cl.
*F16C 37/00* (2006.01)
*F03D 80/70* (2016.01)
*F03D 80/60* (2016.01)

(52) U.S. Cl.
CPC ............. *F16C 37/00* (2013.01); *F03D 80/70* (2016.05); *F03D 80/60* (2016.05); *F05B 2240/50* (2013.01); *F05B 2260/201* (2013.01); *F16C 37/007* (2013.01); *F16C 2360/31* (2013.01); *Y02E 10/721* (2013.01); *Y02E 10/722* (2013.01)

(58) Field of Classification Search
CPC .. Y02E 10/70; F05B 2240/21; F05B 2240/24; F05B 2240/10; F05B 2240/20; F05B 2240/96; F05B 2240/50; F05B 2240/60; F03D 7/00; F03D 9/00; F16C 33/00; B60K 16/00; B60L 8/006; H02J 3/386; H02P 2009/004
USPC ......... 384/476, 91; 290/44, 55; 415/2.1, 4.1, 415/4.2, 4.5, 4.4, 905, 906; 310/90, 64; 165/287
See application file for complete search history.

(56) References Cited

U.S. PATENT DOCUMENTS

| | | | |
|---|---|---|---|
| 4,541,738 A * | 9/1985 | Leibensperger et al. | 384/470 |
| 5,183,342 A | 2/1993 | Bailey | |
| 5,224,142 A * | 6/1993 | Ono et al. | 378/128 |
| 5,686,769 A * | 11/1997 | Stephany et al. | 310/64 |
| 5,854,522 A * | 12/1998 | Iwata et al. | 310/89 |

(Continued)

FOREIGN PATENT DOCUMENTS

| | | |
|---|---|---|
| DE | 102007003618 A1 | 7/2008 |
| EP | 1394406 A2 | 3/2004 |

(Continued)

*Primary Examiner* — Tulsidas C Patel
*Assistant Examiner* — Charles Reid, Jr.

(57) ABSTRACT

A direct drive wind turbine with a cooling system has a generator with a rotor and a stator and a bearing with an inner ring and an outer ring connecting the rotor and the stator rotatively. The cooling system includes at least one heat sink which is in thermal communication with the inner ring of the bearing and a heat dissipater which is in thermal communication with the heat sink.

9 Claims, 3 Drawing Sheets

(56) References Cited

U.S. PATENT DOCUMENTS

| | | |
|---|---|---|
| 6,445,769 B1 | 9/2002 | Carlson |
| 6,755,572 B1 * | 6/2004 | Kinbara .................. 384/462 |
| 6,774,504 B1 * | 8/2004 | Lagerwey .................. 290/44 |
| 2005/0040776 A1 * | 2/2005 | Sibley .................... 318/150 |
| 2005/0082836 A1 * | 4/2005 | Lagerwey .................. 290/44 |
| 2005/0141796 A1 * | 6/2005 | Katsuzawa et al. .......... 384/473 |
| 2006/0001269 A1 * | 1/2006 | Jansen et al. ............. 290/44 |
| 2006/0066110 A1 * | 3/2006 | Jansen et al. ............. 290/44 |
| 2006/0066155 A1 * | 3/2006 | Matin et al. .............. 310/52 |
| 2006/0071575 A1 * | 4/2006 | Jansen et al. ............. 310/266 |
| 2007/0040385 A1 * | 2/2007 | Uchiyama ................. 290/44 |
| 2007/0103027 A1 * | 5/2007 | Jansen et al. ............. 310/266 |
| 2007/0108865 A1 * | 5/2007 | Jansen et al. ............. 310/266 |
| 2007/0281558 A1 * | 12/2007 | Jansen et al. ............. 440/6 |
| 2008/0315709 A1 * | 12/2008 | Uchiyama ................. 310/209 |
| 2009/0188621 A1 * | 7/2009 | Rippel et al. ............. 156/287 |
| 2009/0289512 A1 * | 11/2009 | Prucher .................. 310/54 |
| 2010/0079016 A1 * | 4/2010 | Hemmelmann et al. ....... 310/54 |
| 2010/0164232 A1 * | 7/2010 | Siegfriedsen ............. 290/55 |

FOREIGN PATENT DOCUMENTS

| | | |
|---|---|---|
| EP | 1710432 A1 | 10/2006 |
| JP | 4025343 | 1/1992 |
| JP | 2004518262 A | 6/2004 |
| JP | 2008157340 A | 7/2008 |
| JP | 2009299656 A | 12/2009 |
| WO | WO 2008041919 A1 * | 4/2008 |
| WO | WO 2009000268 A2 | 12/2008 |

\* cited by examiner

DIRECT DRIVE WIND TURBINE WITH A COOLING SYSTEM

CROSS REFERENCE TO RELATED APPLICATIONS

This application is the US National Stage of International Application No. PCT/EP2010/053986, filed Mar. 26, 2010 and claims the benefit thereof. The International Application claims the benefits of European application No. 10000194.0 filed Jan. 11, 2010. All of the applications are incorporated by reference herein in their entirety.

FIELD OF INVENTION

The present invention relates in general to wind turbines. In particular, the present invention is directed to the cooling of a bearing of a wind turbine.

BACKGROUND OF INVENTION

The bearing of a wind turbine has a clearance of approximately −0.1 to 0.2 mm In order to control the lifetime and air-gap of the generator it is advantageous to control the clearance. The problem is that the inner ring of the bearing heats up and expands which leads to reduced lifetime of the bearing. The reason for the heat up is that the inner ring of the bearing together with the shaft structure has a small mass/stiffness compared to the mass/structure of the outer ring. This means that the average temperature of the inner ring is higher than the average temperature of the outer ring and structure around the outer ring.

The bearing of a wind turbine is normally not cooled. However, it is generally known to cool a bearing by an integrated oil lubrication system where the oil is cooled and pumped around in the bearing assembly. The exchange of oil is limited and not sufficient in order to cool down a large main bearing for a direct drive wind turbine. Furthermore, oil lubrication systems for integrated cooling are complex and there is always the risk of oil leakage in the wind turbine which should be avoided.

For grease lubricated bearings no cooling systems are known.

SUMMARY OF INVENTION

It is therefore an object of the present invention to provide improved cooling for a bearing.

This object is solved by the features of the independent, respectively. The dependent claims offer further details and advantages of the invention.

In one aspect the invention is directed to a direct drive wind turbine with a cooling system. The wind turbine has a generator with a rotor and a stator, a bearing with an inner ring and an outer ring connecting the rotor and the stator rotatively. The cooling system comprises at least one heat sink which is in thermal communication with the inner ring of the bearing and a heat dissipater which is in thermal communication with the heat sink Cooling the inner ring allows to control and reduce or eliminate the temperature difference between the inner and the outer ring of the bearing during operation of the wind turbine. Uncontrolled and unwanted thermal expansion of the inner ring is thus avoided. Reliability and lifetime of the bearing is increased.

It is now possible to control the bearing clearance (−0.1 to 0.2) in order to control and maintain the lifetime and the air-gap of the generator.

The cooling system can be used for grease and oil lubricated bearings as well.

The heat sink of the direct drive wind turbine may comprise a cooling reservoir for a cooling medium like water. This way, a water cooling system which is already installed in the nacelle can be used to provide a sufficient cooling of the inner ring of the bearing. This solution can be easily installed in existing wind turbines having no cooling for the bearing.

The heat sink may be arranged at an inner circumferential surface of the inner ring. The inner circumferential surface offers a good contact region for the heat sink because of the good size and surface characteristics.

The heat sink may be formed integrally with the inner ring. At least part of the heat sink may be located inside the inner ring which can improve the heat transfer from the inner ring to the heat sink The heat sink may both comprise integrally formed parts and parts arranged at the surface of the inner ring.

The cooling system can be an easy to install add on solution for a standard bearing or it can be an integrated part of the inner or outer ring in such a way that cooling channels or chambers for example are integrated in the inner and/or outer ring of the bearing.

The heat sink may be connected with the heat dissipater via a conduct. The heat sink preferably a cooling reservoir may be connected to a water cooling system of the wind turbine that is already installed in the nacelle for cooling the generator etc. The heat dissipater of the water cooling system is used for cooling the bearing as well. The conduct can be equipped with a valve to control the flow of the cooling medium into and from the cooling reservoir to control the cooling of the bearing.

On the other hand, a heat sink can be used which cools the inner ring locally like cooling fins or peltier elements, for example.

A heat sink may be provided for the outer ring of the bearing as well. Having a heat sink at the outer ring as well improves the cooling capabilities for the bearing.

Thermal interface material may be arranged between the bearing and the heat sink. To provide a low thermal resistance, a sheet of aluminium, temperature conductive paste or other suitable thermal interface material can be applied between the surface of the inner ring and the surface of the heat sink The cooling system may comprise at least one temperature measurement device and a control device for controlling the temperature of the bearing. The temperature measurement device may be installed at the inner ring, even at multiple measurement points to allow for an accurate and reliable temperature survey of the inner ring and the bearing. The control device may be used to control the cooling of the inner ring by controlling a valve located in a conduct between the heat sink and the heat dissipater.

The generator may be an outer rotor/inner stator generator. The inner ring of the bearing may be connected to a stationary part of the wind turbine and the outer ring of the bearing may be connected to a rotor yoke of the wind turbine.

The cooling system may comprise a number of cooling reservoirs with substantially the same outer radius as the inner radius of the inner ring of the bearing. The length of the reservoirs may cover only part of the perimeter so that more than one reservoir is arranged to cool the inner ring, which makes the installation of the cooling system on existing installations easier.

In another aspect the invention is directed to a bearing assembly comprising an inner ring and an outer ring, wherein at least one cooling reservoir is arranged at the inner and/or the outer ring and wherein the cooling reservoir comprises at least one port for exchange of a cooling medium. Providing cooling reservoirs directly at the bearing allows for a quick and thorough temperature adjustment. Reliability and lifetime of the bearing is thereby increased.

A number of cooling reservoirs may be evenly distributed along an inner circumference of the inner ring. This arrangement facilitates the installation into an already existing wind turbine. Further, it can adjust for local temperature variations.

The cooling reservoirs may extend along an inner circumferential surface of the inner ring and two cooling reservoirs may be arranged in parallel. This arrangement makes an even finer temperature correction possible. Hot spots for example can be eliminated.

At least one temperature measurement device may be arranged at the inner and/or the outer ring in order to measure the temperature of the ring or the bearing. The measurement values can be provided to a control device to allow for a good temperature regulation of the bearing.

In a further aspect the invention is directed to a method for controlling the temperature of a bearing. The temperature of the bearing is measured and the flow of a cooling medium like water through at least one cooling reservoir attached to a ring of the bearing is controlled. Employing this method allows to control the temperature of a bearing whereby reliability and lifetime of the bearing is increased.

At least one cooling reservoir may be attached to the inner ring of the bearing and the temperature may be measured at least one point of the inner ring of the bearing. In numerous designs the inner ring is the hottest part of the bearing and it is advantageous to measure and cool this part directly.

BRIEF DESCRIPTION OF THE DRAWINGS

The accompanying drawings are included to provide a further understanding of embodiments. Other embodiments and many of the intended advantages will be readily appreciated as they become better understood by reference to the following detailed description. The elements of the drawings do not necessarily scale to each other Like reference numbers designate corresponding similar parts.

DETAILED DESCRIPTION OF INVENTION

Figure 1:
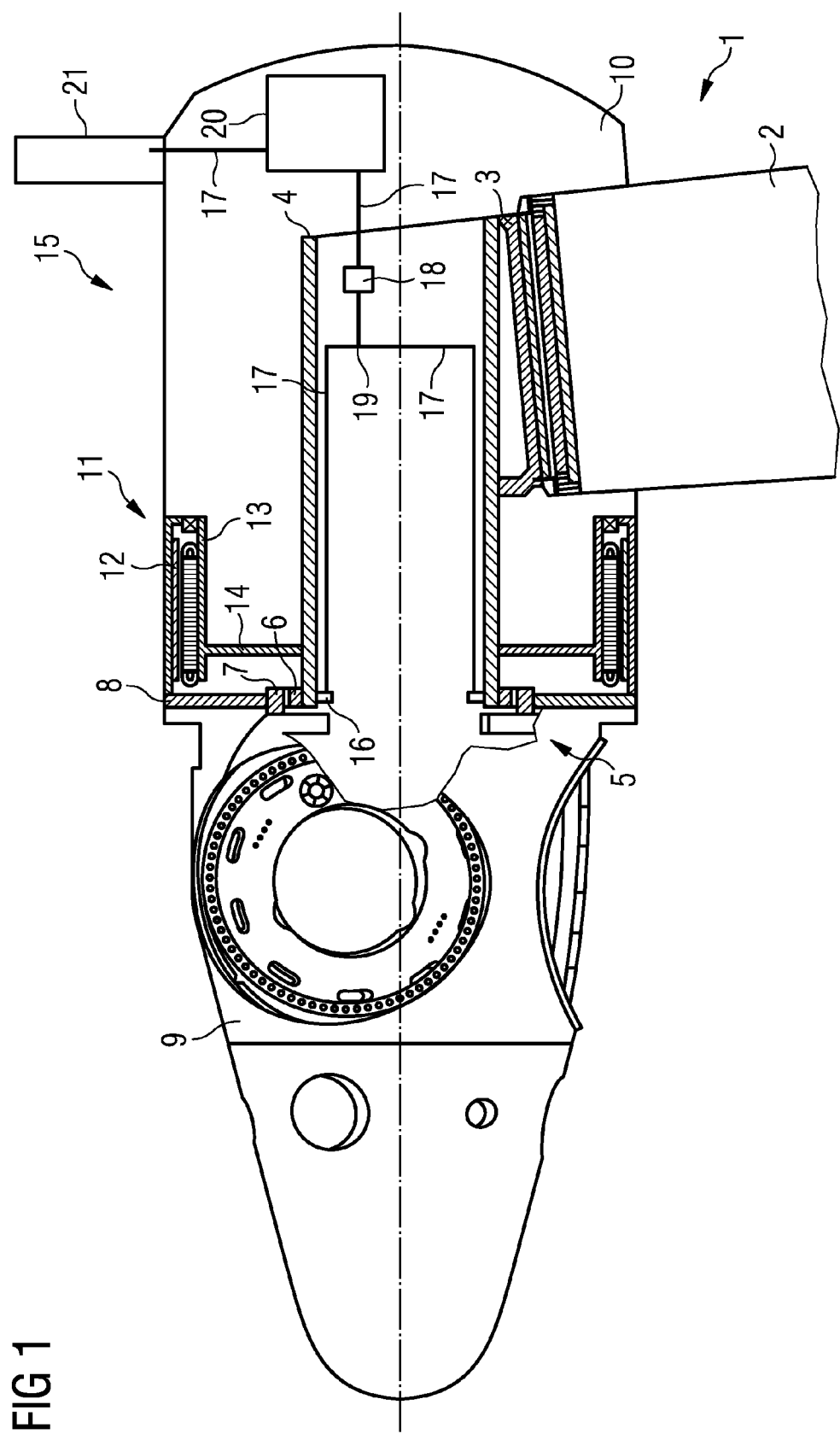
FIG. 1 illustrates a schematic view of a central portion of a wind turbine including a bearing and a cooling system according to the invention.

In the following detailed description, reference is made to the accompanying drawings which form a part hereof and in which are shown by way of illustration specific embodiments in which the invention may be practiced. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

A wind turbine 1 has a tower 2 which is fixed to the ground and carries the whole structure of the wind turbine 1. At the top of the tower 2 a tower connector 3 is attached. The tower connector 3 carries a main shaft 4 of the wind turbine 1. To one end of the main shaft 4 opposite to the tower connector 3 a bearing 5 often called main bearing is fixed. The bearing 5 has an inner ring 6 which is fixed to the main shaft 4 and an outer ring 7. The outer ring 7 is connected to a rotor yoke 8. The rotor yoke 8 is connected with a blade hub 9 which carries the blades of the wind turbine 1. The blades are not illustrated for the sake of clarity. A nacelle 10 surrounds the main shaft 4 and is attached at the main shaft 4.

The wind turbine 1 is a direct drive wind turbine, i.e. the generator 11 is coupled directly to the main shaft 4 and the rotor yoke 8, respectively. No transmission is utilized. The generator 11 comprises an outer rotor 12 attached to the rotor yoke 8 and an inner stator 13 which is fixed to the main shaft 4 via a holding structure 14.

The rotor yoke 8 to which the outer ring 7 is attached is in contact with the ambient air. Therefore, cooling of the outer ring 7 occurs by the ambient air. The inner ring 6 however is located inside the structure of the wind turbine 1 so that no cooling is achieved by ambient air. This leads to a difference in temperature between the inner and outer ring 6 and 7, respectively.

The inner ring 6 of the bearing 5 together with the main shaft 4 has a smaller mass compared to the outer ring 7 and the rotor structure. Therefore, inner ring 6 tends to heat up quicker then the outer ring 7.

Furthermore, the inner ring 6 is normally electrical insulated from the main shaft 4 in order to prevent an electrical pathway from the rotor 12 to the stator 13 assembly, but the electrical insulation reduces the thermal conductivity between the inner ring 6 and the main shaft 4 causing an even further heating of the inner ring 6.

The wind turbine 1 is equipped with a cooling system 15 which carries heat away from the bearing 5, especially from the inner ring 6. The cooling system 15 has one or more heat sinks or cooling reservoirs 16 which are attached to an inner circumferential surface of the inner ring 6. Here, multiple cooling reservoirs 16 are attached to the inner ring 6. Details of the arrangement of the cooling reservoirs 16 will be discussed in conjunction with FIGS. 2 and 3.

Each cooling reservoir 16 is connected with a conduct 17 in order to circulate a cooling medium like water through the cooling reservoir 16. The cooling medium transports the heat away from the inner ring 6. The conducts 17 are shown schematically. The actual course of the conducts 17 may differ from the course shown, for example to avoid obstacles or sharp bends. Also, a closed loop for the cooling medium may be preferred. For ease of understanding FIG. 1 shows one conduct 17 per cooling reservoir 16.

A valve 18 controls the flow of the cooling medium through the conducts 17. The valve 18 may be located before a crosspoint 19 so that the single valve 18 controls the flow of the cooling medium through all conducts 17. The wording before means in this context in the direction of flow of the cooling medium towards the cooling reservoirs 6. Alternatively, one valve may be employed in each conduct to control each cooling reservoir 16 individually. Further, a combination of both is possible. Then each valve may control a group of cooling reservoirs 16.

Further in front of the valve 18 a central device 20 of the cooling system 15 is located. The central device 20 comprises for example a pump for the cooling medium and a control unit. Connected to the central device 20 is a heat dissipater or radiator 21. The heat dissipater 21 is arranged outside the nacelle 10 to use ambient air for cooling down the cooling medium. The heat dissipater 21 may be arranged on top of the nacelle 10 for optimal heat transfer. The valve 18 is connected with the central device 20 via a further part of the conduct 17. The central device 20 is connected with the heat dissipater 21 via another part of the conduct 17.

The cooling medium circulates from the heat dissipater 21 through the central device 20 and further through valve 18 which controls the flow of the cooling medium. At the crosspoint 19 the conduct 17 branches out and the cooling medium flows to the cooling reservoirs 16. While flowing through the cooling reservoirs 16 the cooling medium absorbs heat from the inner ring 6. The cooling medium flows back to the heat dissipater 21 where it is cooled down. The conduct or conducts for transporting the cooling medium back to the heat dissipater 21 are not shown for the sake of clarity.

Part of the cooling system 15 like the central device 20 and the heat dissipater 21 may be used for cooling other devices like the generator 11. If the cooling system 15 is retro-fitted into a wind turbine already existing parts like the central device 20 and the heat dissipater 21 may be used for the cooling of the bearing 5 as well.

In order to control the cooling of the bearing 5 one or more temperature measurement devices or temperature sensors can be employed. The temperature sensor can be arranged at the inner ring 6 for temperature measurement. The results of the measurement are forwarded to the central device 20 which controls the valve 18 based upon the temperature measurement. In a smaller loop of control the temperature sensor controls the valve 18 directly. A combination of several temperature sensors in conjunction with several valves 18 and cooling reservoirs 16 allows for a finer temperature control. In this case the inner ring 6 can be divided in several zones of control. To each zone one or more cooling reservoirs 16, a conduct or part of the conduct 17 and a valve 18 are assigned.

This embodiment employs cooling reservoirs 16 and conducts 17 using a cooling medium like water. It is also possible to use an in a way local heat sink and dissipater. The wording local encompasses a heat sink and dissipater arranged close or directly at the bearing 5 or the inner ring 6. Embodiments for this concept are for example heat sinks with fins or peltier elements. The heat transfer may be supported by an air convection system which streams ambient air along the local heat sink and dissipater.

Figure 2:
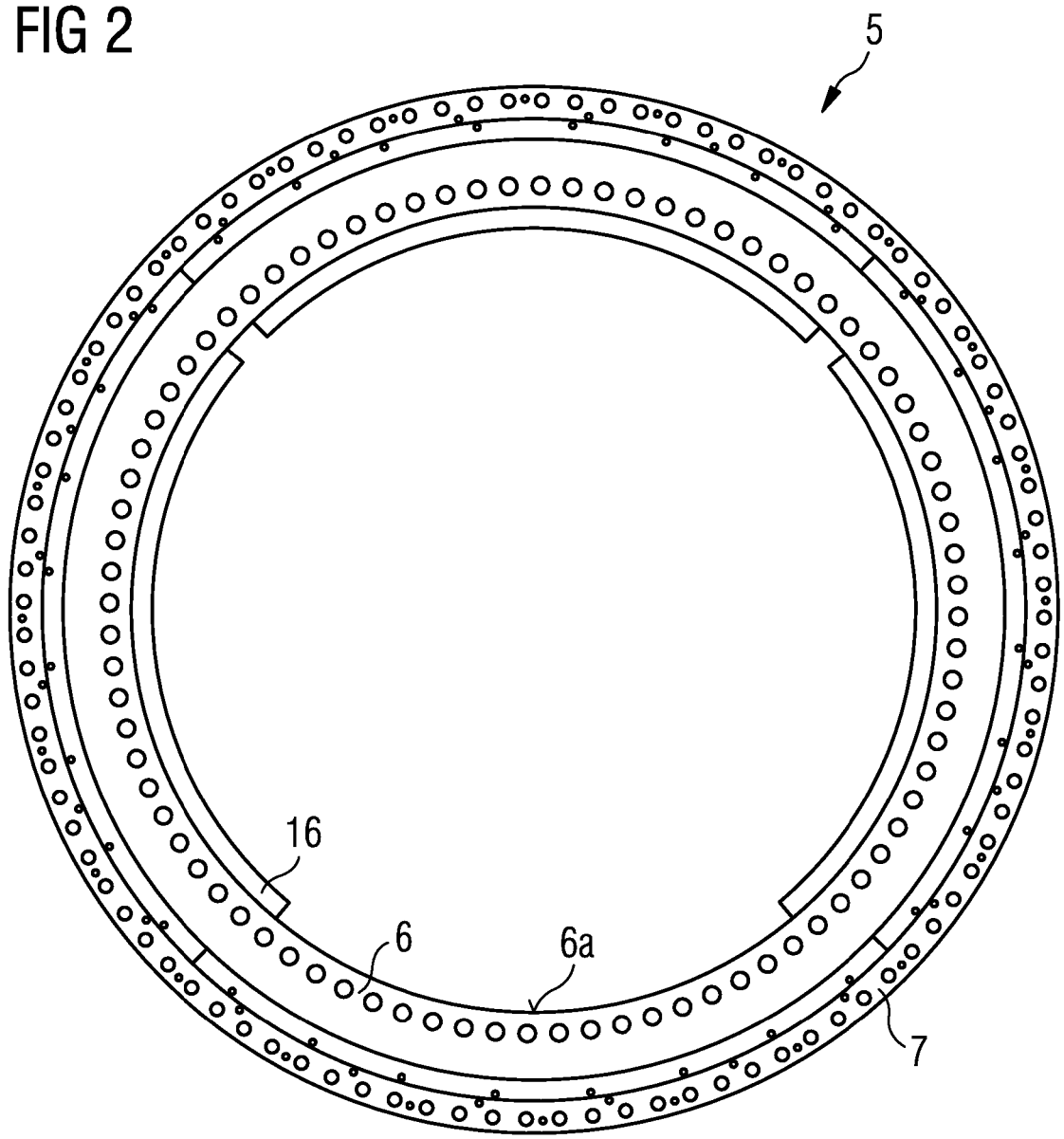
FIG. 2 illustrates a front view of a bearing with a cooling system according to the invention.

FIG. 2 shows the bearing 5 with inner ring 6 and outer ring 7. Each ring 6,7 has a flange for mounting the bearing 5 at the main shaft 4 and the rotor yoke 8, respectively.

Along an inner circumferential surface 6a of the inner ring 6 three cooling reservoirs 16 are arranged. The bent shape of the cooling reservoirs 16 is adapted to fit onto the inner circumferential surface 6a. For improved thermal contact between the cooling reservoirs 16 and the inner ring 6 thermal interface material like a sheet of aluminium or a heat conducting paste can be employed. The cooling reservoirs 16 can be evenly distributed along the circumference or can be spaced unevenly as shown to account for restrictions in space for example. It is also possible to attach one or more heat sinks or cooling reservoirs at a face side of the inner ring 6. Care has to be taken that the heat sink stays free from the mounting devices e.g. bolts which connect the inner ring 6 to the main shaft 4.

Each cooling reservoir 16 has a hollow interior space through which a cooling medium like water or a gas can circulate. For entry and exit of the cooling medium the cooling reservoir 16 is equipped with at least one port (not shown). Two ports may be used wherein the ports can be arranged at both ends of the cooling reservoir 16 so that the cooling medium streams through the whole cooling reservoir 16. This ensures a good heat transfer from the inner ring 6 via the cooling reservoir 16 to the cooling medium.

Each cooling reservoir 16 may be connected with its own conduct to the heat dissipater 21 or to a crosspoint. This is a parallel set-up. Alternatively a serial set-up is possible in which an exit port of one cooling reservoir 16 is connected to an entry port of a subsequent cooling reservoir 16. One large cooling reservoir which covers the complete inner surface 6a or most of it may be utilized as well.

The heat sink or cooling reservoir 16 can be integrated into the structure of the inner ring 6. Inner boreholes or channels can be utilized to stream a cooling medium through the inner ring 6. One or more ports for circulation of the cooling medium are then arranged directly at the inner ring 6. A combination of integrally formed heat sinks and external heat sinks is possible as well. For example, grooves may be formed integrally in the surface of the inner ring 6 which communicate with one or more external heat sinks to form a cooling reservoir.

Figure 3:
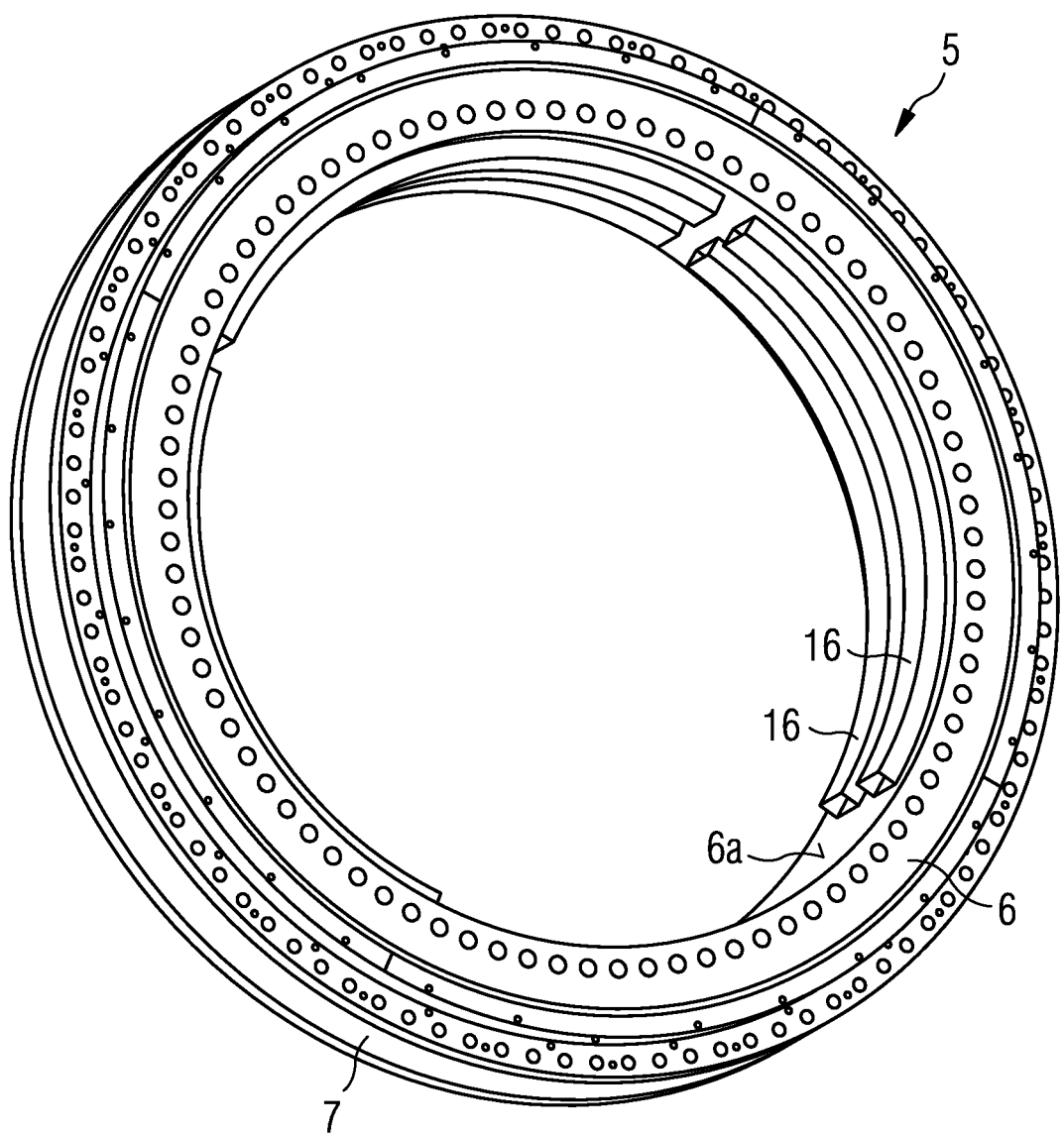
FIG. 3 illustrates a perspective view of a bearing with a cooling system according to the invention.

FIG. 3 shows a bearing 5 with inner 6 and outer ring 7. At the inner circumferential surface 6a of the inner ring 6 heat sinks or cooling reservoirs 16 are arranged. Here, six cooling reservoirs 16 are attached to the inner ring 6. Along the circumference of the inner ring 6 three pairs of two parallel cooling reservoirs 16 are arranged. This arrangement permits a good heat transfer between the inner ring 6 and the cooling medium inside the cooling reservoirs 16. The detailed discussion of FIG. 2 applies also for the bearing 5 shown in FIG. 3.

According to a method for controlling the temperature of a bearing 5 the temperature is measured at the bearing 5. The temperature can be measured directly at the inner ring 6 as this will be in most cases the hottest part of the bearing 5. Commonly known devices for the measurement of the temperature can be employed.

On the basis of the measurement the flow of a cooling medium through the one or more cooling reservoirs 16 is controlled. If, for example the measured temperature reaches an upper threshold the flow of the cooling medium can be increased or the temperature of the cooling medium can be reduced. This leads to higher heat removal. If, for example the measured temperature reaches a lower threshold the flow of the cooling medium can be decreased or the temperature of the cooling medium can be raised. This leads to a lower heat removal. This scheme holds the temperature of the bearing 5 or the inner ring 6 in a defined target corridor. The target corridor can be adapted to models of wind turbines using for example a default setting. The target corridor can also be adapted in real-time for example depending on the wind speed or the ambient temperature. Instead of a target corridor a target point of a certain temperature can be used.

The flow of the cooling medium can be controlled by one or more valves 18 which are located in the conducts 17 reaching to the cooling reservoirs 16. The valves 18 can be controlled by the temperature measurement devices directly or by the central device 20 of the cooling system 15.

The invention claimed is:

1. A direct drive wind turbine comprising:
   a generator with a rotor and a stator;
   a bearing with an inner ring and an outer ring connecting the rotor and the stator rotatively,
   a cooling system comprising:
   a heat sink being in thermal communication with the inner ring of the bearing, and
   a heat dissipater being in thermal communication with the heat sink.

2. The direct drive wind turbine according to claim 1, wherein the heat sink comprises a cooling reservoir for a cooling medium.

3. The direct drive wind turbine according to claim 1, wherein the heat sink is arranged at an inner circumferential surface of the inner ring.

4. The direct drive wind turbine according to claim 1, wherein the heat sink is formed integrally with the inner ring.

5. The direct drive wind turbine according to claim 1, wherein the heat sink is connected with the heat dissipater via a conduct.

6. The direct drive wind turbine according to claim 1, wherein a heat sink is provided for the outer ring of the bearing.

7. The direct drive wind turbine according to claim 1, wherein a thermal interface material is arranged between the bearing and the heat sink.

8. The direct drive wind turbine according to claim 1, wherein the cooling system comprises a temperature measurement device and a control device for controlling the temperature of the bearing.

9. The direct drive wind turbine according to claim 1, wherein the rotor is an outer rotor and the stator is an inner stator, and
   wherein the inner ring of the bearing is connected to a stationary part of the direct drive wind turbine and the outer ring of the bearing is connected to a rotor yoke of the direct drive wind turbine.

* * * * *